Dec. 8, 1931.  J. I. LINER  1,835,505
SYNCHRONOUS CLOCK MOTOR
Filed Oct. 9, 1930     2 Sheets-Sheet 1

Inventor

Attorney

Dec. 8, 1931.    J. I. LINER    1,835,505
SYNCHRONOUS CLOCK MOTOR
Filed Oct. 9, 1930    2 Sheets-Sheet 2
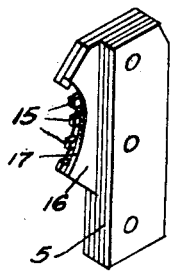
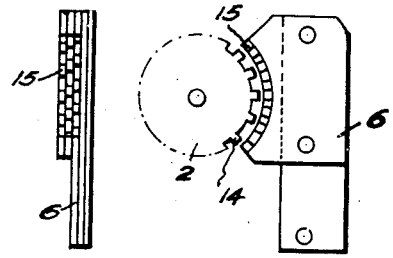
Inventor
Attorney Patented Dec. 8, 1931

1,835,505

UNITED STATES PATENT OFFICE

JOSEPH I. LINER, OF NEWARK, NEW JERSEY, ASSIGNOR TO L. S. BRACH MANUFACTURING CORP., OF NEWARK, NEW JERSEY

SYNCHRONOUS CLOCK MOTOR

Application filed October 9, 1930. Serial No. 487,462.

This invention relates to the design of a small alternating current synchronous motor especially adapted for use in clocks, although other uses may be later found for it.

In the last few years, power companies have given much attention to the regulation of the frequency of the current supplied to their customers. For example, in Newark, N. J., the public service electric power machines are kept accurately in step with the Arlington time signal system, whereby sixty-cycle timing is guaranteed to the consumer. This close attention to the regulation of frequency of power lines has promoted the use of alternating current electric clocks which are intended to, and must if they function properly, run in synchronism with the sixty-cycle current, this being the frequency almost universally supplied to homes for lighting purposes.

Generally speaking, synchronous motors are non-self-starting and means must be provided to start the motor and thereby the clock; and in addition, means must be provided for bringing the motor into synchronism at the time of starting and for holding it in synchronism in case of sudden changes or surges on the supply lines. So far as I am aware, it has been the practice by designers of synchronous motors for alternating current clocks and the like to provide mechanical movement and inertia means for bringing the motor into step or synchronism at the time of starting it and for holding it in step after it has been started. Certain prior art clock and motor mechanisms are exemplified in Hammond Patent 1,719,805 and Michl Reissue Patent 17,779, wherein are used inertia and friction means which are the important factors in the operation of the devices.

I have found after considerable study and experimentation that many improvements can be made in a synchronous motor of the type herein described, and it is therefore the principal object of my invention to do away with all mechanical movement, inertia means, and special friction devices, thereby materially simplifying the entire construction and reducing the cost of the motor as well as that of the clock, at the same time retaining the advantages of easy starting of the motor and the clock and insuring that the motor will stay in synchronism under wide changes in load conditions, as well as ordinary disturbances on the power supply circuits.

Heretofore, it has been found necessary, as set forth in said patents above referred to, to start or launch the clock motor at a speed at or above synchronism, and then rely on inertia and friction means to bring the motor into step and hold it there. It is a further object of my invention to do away with all such devices and construct the motor itself without these extraneous devices, while at the same time it will meet to a greater extent, than any other device of which I am aware, the conditions which must be fulfilled in practice.

Another object of my invention is to provide a motor which is much smaller in size and more compact, due to the elimination of the parts aforesaid, thereby lightening the whole clock.

Other objects will be clear to one skilled in the art after reading the specification taken in connection with the annexed drawings, wherein:

Figure 6 is a perspective view of a preferred form of pole piece comprising a part of the field of the motor.

Figure 7 is a modified form of pole piece showing the polar projections in staggered relationship, like the polar projections shown in Figures 4 and 5.

Figure 8 is a view of Figure 7 taken at right angles and in addition shows the rotor in operative position.

Figure 9 is a view similar to Figure 5 but of a modified form of rotor.

Figures 10 and 11 are views similar to

Figure 5:
Figure 5 is a fragmentary plan view of a part of the peripheral surface of the rotor per se as shown in Figures 3 and 4.

Figure 5, but showing a further modified form of rotor.

In the drawings, the motor is composed of two parts, the rotor structure and the stator structure.

Figure 1:
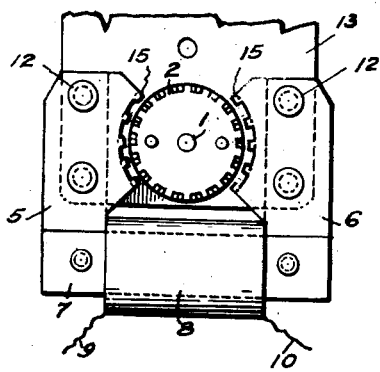
Figure 1 is a view of the rear of the motor with the back plate removed.
Figure 2:
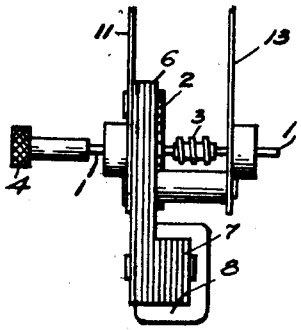
Figure 2 is a side view of Figure 1, but showing the back plate in position.
Figure 3:
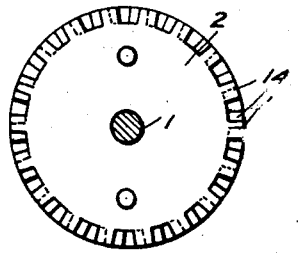
Figure 3 is an enlarged view of the rotor per se.
Figure 4:
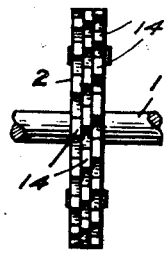
Figure 4 is a side view of Figure 3.

The rotor structure is composed of a shaft 1 having a rotor 2 fastened thereon. The rotor 2, as shown in Figure 4, is composed of a plurality of discs, three being preferred. The shaft 1 also carries a gear wheel in the shape of a worm 3 and a knurled member 4 for turning the rotor structure.

The stator structure comprises a pair of pole pieces 5 and 6 and a yoke 7. On the yoke 7 is carried an energizing coil 8 to which current is conveyed by the wires 9 and 10. The stator structure is attached to a back plate 11 in any satisfactory manner as by rivets 12. A front plate 13 supports one end of the shaft 1, and the two plates 11 and 13 carry the clock mechanism which is old and well known and is therefore not shown and described, except that the gear 3 is utilized for driving the clock mechanism.

As in most alternating current devices, the rotor per se and the stator structure are made up of laminations of magnetic material. In the preferred form of rotor as shown in Figures 1 to 5 inclusive, the rotor is made up of three similar discs each having polar projections 14 which are arranged in offset or staggered relationship and which act in cooperation with the polar projections 15 on the pole pieces 5 and 6. Preferably, the offset arrangement is such that the trailing end of a polar projection on one outside disc is in the same radial plane as the leading end of a polar projection on the other outside disc.

In my preferred form of construction as shown in perspective in Figure 6, only one of the laminations has the polar projections 15 and this lamination is preferably less or equal to the width of the laminations of the rotor shown in Figure 4, especially that of the central lamination thereof. In some cases, I prefer to provide a second or supplemental lamination 16 having an arcuate surface 17 projecting only to approximately the base of the polar projections 15. This enables a greater amount of magnetic flux to be brought up to the polar projections 15 and gives a certain shading effect which I have found to be highly advantageous; and in general, I have found that only one of these shading or supplemental polar surfaces is required, although this depends to some extent on the strength of the electromagnetic coil 8.

By the construction illustrated in Figures 1 to 6, it will be readily understood that following the laws of a magnetic circuit, the rotor 2 will center itself between the pole pieces 5 and 6 so that the polar projections 15 will be in alignment or in the same plane with the polar projections 14 on the central disc of the rotor 2, and this will be the normal relative position of the rotor between the pole pieces 5 and 6, it being understood that the magnetic centralizing force is greater than the lateral pull of the worm 3.

In the starting of this type of motor, I have found that a very slight turn of the member 4 will cause the rotor to pick up and it will be quickly dragged into synchronism even though the speed to which the rotor is turned is considerably below synchronism. This, I believe to be due to the staggered or offset arrangement of the polar projections 14 on the rotor, as there will always be certain of these projections in cooperative position with the polar projections 15 on the field poles, and the tendency is for the rotor to turn instead of to stop, as in prior art devices.

If the operator should turn the shaft 1 of the rotor 2 at a speed above synchronism, the polar projections 14 will catch the rotor and drag it into synchronism which is very readily observed by a lateral jerking motion of the rotor structure as it falls into synchronism.

By reason of the construction already described, any disturbances in the power line which would cause the frequency to change and thereby affect the motor, the staggered relation of the polar projections 14 is such as to overcome such disturbances and hold the motor in step and keep the clock running.

In Figures 7 and 8, there is shown a reverse construction to that shown in the previous figures in that three of the pole piece laminations have their polar projections 15 arranged in staggered relationship and the rotor 2 is made of a single lamination of substantially the width of one of the laminations comprising the stator.

In Figures 9 and 10, the polar projections 14 are arranged in a somewhat different manner than in the other forms illustrated.

In Figure 11, the polar projections 14 are arranged in herring-bone fashion.

From what has been said, it will be seen that no separate synchronizing movable weight, adapted to impart to the rotor an additional variable inertia moment, increasing and decreasing with changes of speed of the revolutions of the rotor, is required; but on the contrary, the rotor and stator are so constructed that the motor per se will function to produce the desired results; i. e., that of easy starting and keeping in perfect synchronism with the power supply.

Further, it will be appreciated that certain of the mechanical details of my improved form of motor may be varied without departing from the spirit of my invention or the scope of the appended claims.

Having thus described my invention, what I claim is:

1. In an alternating current electric clock, a synchronous motor having a field structure and a rotor, means for initially turning said rotor to start the clock, said rotor structure including a plurality of laminations of magnetic material having polar projections arranged in staggered relationship, while said field structure includes at least two pole pieces each having polar projections for cooperation with said rotor polar projections as and for the purposes described.

2. In an alternating current electric clock, a synchronous motor having a field structure and a rotor, means for initially turning said rotor to start the clock, said rotor structure including three similar laminations having polar projections arranged in staggered relationship, while said field structure includes at least two pole pieces each having polar projections for cooperation with said rotor polar projections as and for the purposes described.

3. In an alternating current electric clock, a synchronous motor having a field structure and a rotor, means for initially turning said rotor to start the clock, said rotor structure including three similar laminations having polar projections arranged in staggered relationship, said field structure including at least two pole pieces each made of laminations of magnetic material, only one lamination of each of said pole pieces having polar projections for cooperation with said rotor polar projections as and for the purposes described.

4. In an alternating current electric clock, a synchronous motor having a field structure and a rotor, means for initially turning said rotor to start the clock, said rotor structure including three similar laminations having polar projections arranged in staggered relationship, said field structure including at least two pole pieces each made of laminations of magnetic material, only one lamination of each of said pole pieces having polar projections for cooperation with said rotor polar projections, and at least a second lamination having an arcuate pole surface extending substantially to the base of said polar projections on the said one lamination of each pole piece.

5. In an alternating current electric clock, a synchronous motor having a field structure and a rotor, means for initially turning said rotor to start the clock, said rotor structure including a plurality of laminations of magnetic material having polar projections arranged in staggered relationship, while said field structure includes at least two pole pieces, each being composed of a plurality of laminations only one of which has polar projections for cooperation with said rotor polar projections as and for the purposes described.

6. In an alternating current electric clock, a synchronous motor having a field structure and a rotor, means for initially turning said rotor to start the clock, said rotor structure including a plurality of laminations of magnetic material having polar projections arranged in staggered relationship, while said field structure includes at least two pole pieces, each being composed of a plurality of laminations only one of which has polar projections for cooperation with said rotor polar projections, and at least a second lamination having an arcuate pole surface extending substantially to the base of said polar projections on the said one lamination.

7. An alternating current synchronous motor including; a rotor having a plurality of polar projections arranged in offset relationship in different planes at right angles to the axis of the rotor, and a stator having field poles with means for exciting the same, each of said field poles having a single arcuate row of spaced polar projections having a width preferably not greater than that of a polar projection on the rotor.

8. An alternating current synchronous motor including; a rotor having a plurality of polar projections arranged in offset relationship in different planes at right angles to the axis of the rotor, and a stator having field poles with means for exciting the same, each of said field poles having a single arcuate row of spaced polar projections having a width preferably not greater than that of a polar projection on the rotor, and a supplemental arcuate pole surface extending to approximately the base of said polar projections of said single row of field projections.

9. An alternating current synchronous motor including; a rotor composed of three similar laminations having polar projections arranged in offset relationship, and a stator having field poles with means for exciting the same, each of said field poles including a single lamination having spaced polar projections of a width substantially the same as one of the laminations of the rotor.

10. An alternating current synchronous motor including; a rotor composed of three similar laminations having polar projections arranged in offset relationship, and a stator having field poles with means for exciting the same, each of said field poles including a single lamination having spaced polar projections of a width substantially the same as one of the laminations of the rotor, and a supplemental flux-carrying member on each pole piece having an arcuate polar surface extending to near the base of the polar projections on said single lamination.

11. An alternating current synchronous motor including; a rotor having a row of spaced radial polar projections and a stator having field poles with means for exciting the same, each of said field poles including three laminations of substantially the same outline and each having polar projections extending toward the rotor, but the projections being arranged in offset relation on the different laminations, and at least one set of projections being approximately the same thickness as the rotor projections.

12. In an alternating current electric clock a non-self-starting motor including a rotor structure and a stator structure, said rotor structure comprising the following instrumentalities; a shaft with means thereon for turning the shaft, a gear-wheel to drive the clock mechanism, and a plurality of discs of magnetic material each having spaced peripheral polar projections and arranged on the shaft so said projections of the different discs are not in the same radial plane; said stator structure comprising a plurality of pole pieces connected by a yoke with means for exciting the whole, each pole piece including a single lamination having arcuately spaced polar projections preferably of the same thickness as the center disc on said rotor, and arranged to cooperate with said rotor disc projections as and for the purposes described.

13. In an alternating current electric clock, a synchronous motor having a field structure and a rotor, means for initially turning said rotor to start the clock, said rotor structure including a plurality of laminations of magnetic material having polar projections arranged in staggered relationship, the staggering being such that the trailing edges of the polar projections on at least one lamination are in substantially the same radial plane as the leading edges of the polar projections on another lamination, said field structure including at least two pole pieces each having polar projections for cooperation with said rotor polar projections as and for the purposes described.

14. In an alternating current electric clock, a synchronous motor having a field structure and a rotor, means for initially turning said rotor to start the clock, said rotor structure including three similar laminations having polar projections arranged in staggered relationship, the staggering being such that the trailing edges of the polar projections on one outside lamination are in substantially the same radial plane as the leading edges of the polar projections on the other outside lamination, said field structure including at least two pole pieces each made of laminations of magnetic material, only one of which has polar projections for cooperation with said rotor polar projections as and for the purposes described.

15. In an alternating current electric clock, a synchronous motor having a field structure and a rotor, means for initially turning said rotor to start the clock, said rotor structure including preferably an odd number, greater than one, of laminations of magnetic material having polar projections arranged in staggered relationship, while said field structure includes at least two pole pieces each having polar projections for cooperation with said rotor polar projections as and for the purposes described.

16. In an alternating current electric clock, a synchronous motor having a field structure and a rotor, means for initially turning said rotor to start the clock, both the rotor and field structure having cooperative polar projections, said field structure having its polar projections arranged in a single row, while the rotor has a plurality of displaced rows of polar projections, and the rotor structure having a lateral movement to permit the rotor to take up a free alignment in the field.

17. In an alternating current electric clock, a synchronous motor having a field structure and a rotor, means for initially turning said rotor to start the clock, said rotor structure including a plurality of laminations of magnetic material having polar projections arranged in staggered relationship, while said field structure includes at least two pole pieces each having polar projections for cooperation with said rotor polar projections, the entire rotor structure having a lateral movement to permit the rotor to take up a free alignment in the field.

18. An alternating current synchronous motor comprising two structures of magnetic material, one of which structures is rotatable with respect to and by reason of the influence of the other; means for initially rotating the rotatable structure, one of said structures being composed of a plurality of laminations having polar projections arranged in offset relationship, the other of said structures including a single lamination having spaced polar projections of a width to cooperate with the laminations on the other of said structures.

In testimony whereof, I affix my signature.
JOSEPH I. LINER.